US007771269B2

(12) United States Patent
Kuhn et al.

(10) Patent No.: US 7,771,269 B2
(45) Date of Patent: Aug. 10, 2010

(54) ELECTRONIC GAMING MACHINES WITH DIFFERENT PLAYER OR DEALER ASSIGNED VIRTUAL CARD STACKS OR OTHER SYMBOL SETS

(75) Inventors: Michael J Kuhn, Spokane, WA (US); Donald L. Evans, Spokane, WA (US)

(73) Assignee: Digideal Corporation, Spokane, WA (US)

( * ) Notice: Subject to any disclaimer, the term of this patent is extended or adjusted under 35 U.S.C. 154(b) by 998 days.

(21) Appl. No.: 11/505,748

(22) Filed: Aug. 16, 2006

(65) Prior Publication Data

US 2008/0045327 A1 Feb. 21, 2008

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/22; 463/12; 463/13

(58) Field of Classification Search .................. 463/13, 463/20; 273/149 R, 242.2, 292
See application file for complete search history.

(56) References Cited

U.S. PATENT DOCUMENTS

| | | | | |
|---|---|---|---|---|
| 5,377,973 | A * | 1/1995 | Jones et al. | 463/12 |
| 5,816,915 | A * | 10/1998 | Kadlic | 463/13 |
| 5,957,774 | A * | 9/1999 | Holmes et al. | 463/13 |
| 6,651,985 | B2 * | 11/2003 | Sines et al. | 273/309 |
| 2007/0213113 | A1 * | 9/2007 | Dunaevsky et al. | 463/12 |

* cited by examiner

*Primary Examiner*—Pierre E Elisca
*Assistant Examiner*—Reginald A Renwick
(74) *Attorney, Agent, or Firm*—Farrell Patent Law PC; Mark C Farrell

(57) ABSTRACT

A gaming apparatus and methods which include multiple virtual stacks of symbols, such as cards. In one form each player has an individual virtual stack and the dealer has one stack. In another form each player has one stack and the dealer has individual virtual stacks for each player. Other alternatives are also described.

37 Claims, 9 Drawing Sheets

ELECTRONIC GAMING MACHINES WITH DIFFERENT PLAYER OR DEALER ASSIGNED VIRTUAL CARD STACKS OR OTHER SYMBOL SETS

TECHNICAL FIELD

The inventions relate to electronic gaming machines having virtual decks of cards, virtual stacks of symbols or other virtual symbol sets.

BACKGROUND OF THE INVENTION

The casino and gaming industry is confronted with many challenges concerning cheating by players, dealers and others who are constantly looking for new avenues for making money. The industry is highly regulated by government. Thus, there are a number of regulations which also act as constraints in the design, manufacturing and use of gaming equipment.

The casino gaming industry has adopted electronic gaming machines having multiple participants in many places. The machines have certain advantages that are well-known. In the case of card games, the need for cards is eliminated and it is possible to track game action. The tracking of game action may be used for analysis to try and discover cheating schemes and for awarding players complimentary lodging, food, beverages and travel. This tracking is more difficult and of particular advantage when multiple player games are involved, such as table games.

Another problem that has been experienced is where the decision of one player affects the card or cards received by another player. For example, in blackjack, a first player may choose to receive an extra card or more, as compared to what a next or second player thinks is wise. This choice is the free act of the first player, but the next or second player may feel that such decision was unreasonable. This would typically be in the context of where the first player asks for another card and that card causes the first player's count to exceed twenty-one and thus go bust. Then when the next, second player gets his card or cards, if the count for the second player would have resulted in a winner if the first player had not overplayed their hand, then the second player may get angry. This has led to unpleasant exchanges at casino tables and even fist fights.

Besides card games, other casino or gambling games use a variety of symbols, such as slot symbols, numbers, letters or picture symbols or other symbol sets. Such games are sometimes called novelty games. In many there is assignment of symbols from a symbol set. Some of the same problems as discussed above also apply to such novelty games.

The current invention seeks to reduce the risks of cheating and player discord while doing so in a manner that provides compliance with regulatory agencies. Also important is that the players may react more favorably for games using the novel inventions hereof because they may be perceived as fairer.

BRIEF DESCRIPTION OF THE DRAWINGS

Preferred forms, configurations, embodiments and/or diagrams relating to and helping to describe preferred versions of the inventions are explained and characterized herein, often with reference to the accompanying drawings. The drawings and all features shown therein also serve as part of the disclosure of the inventions of the current application. Such drawings are briefly described below.

DETAILED DESCRIPTION OF THE PREFERRED EMBODIMENTS

Introductory Note

The readers of this document should understand that the embodiments described herein may rely on terminology used in any section of this document and other terms readily apparent from the drawings and the language common therefore as may be known in a particular art and such as provided by dictionaries. Widely known are Webster's Third New International Dictionary, The Oxford English Dictionary (Second Edition), and The New Century Dictionary, all of which are hereby incorporated by reference for interpretation of terms used herein and for application and use of words defined in such references to more adequately or aptly describe various features, aspects and concepts shown or otherwise described herein using more appropriate words having meanings applicable to such features, aspects and concepts.

This document is premised upon using one or more terms with one embodiment that may also apply to other embodiments for similar structures, functions, features and aspects of the invention. Wording used in the claims is also descriptive of the invention and the text of both claims and abstract are incorporated by reference into the description entirely in the form as originally filed. Terminology used with one, some or all embodiments may be used for describing and defining the technology and exclusive rights associated therewith.

The readers of this document should further understand that the embodiments described herein may rely on terminology and features used in any section or embodiment shown in this document and other terms readily apparent from the drawings and language common therefore. This document is premised upon using one or more terms or features shown in one embodiment that may also apply to or be combined with other embodiments for similar structures, functions, features and aspects of the invention and provide additional embodiments of the inventions.

Preferred Gaming Table Embodiments

Figure 1:
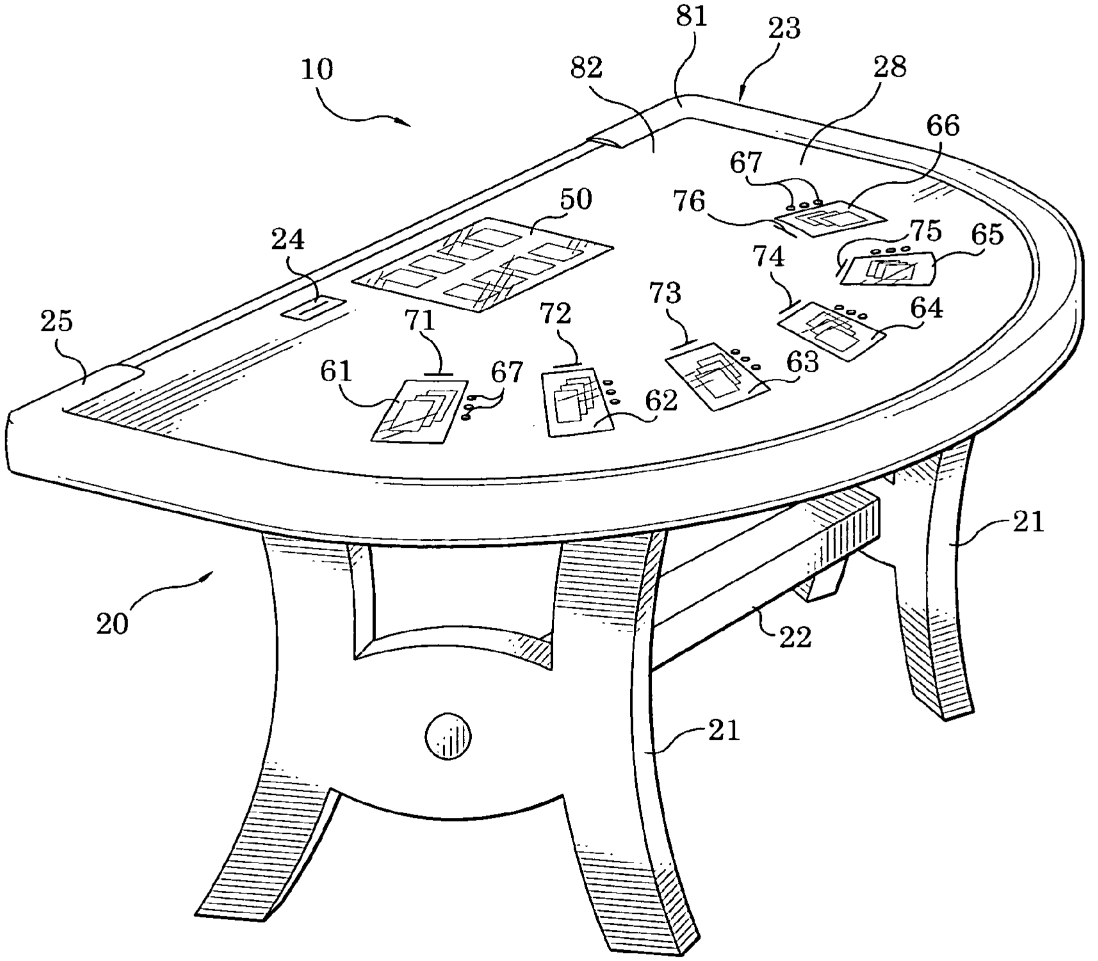
FIG. 1 is a perspective of a table game system which includes preferred embodiments of the inventions described herein.
Figure 9:
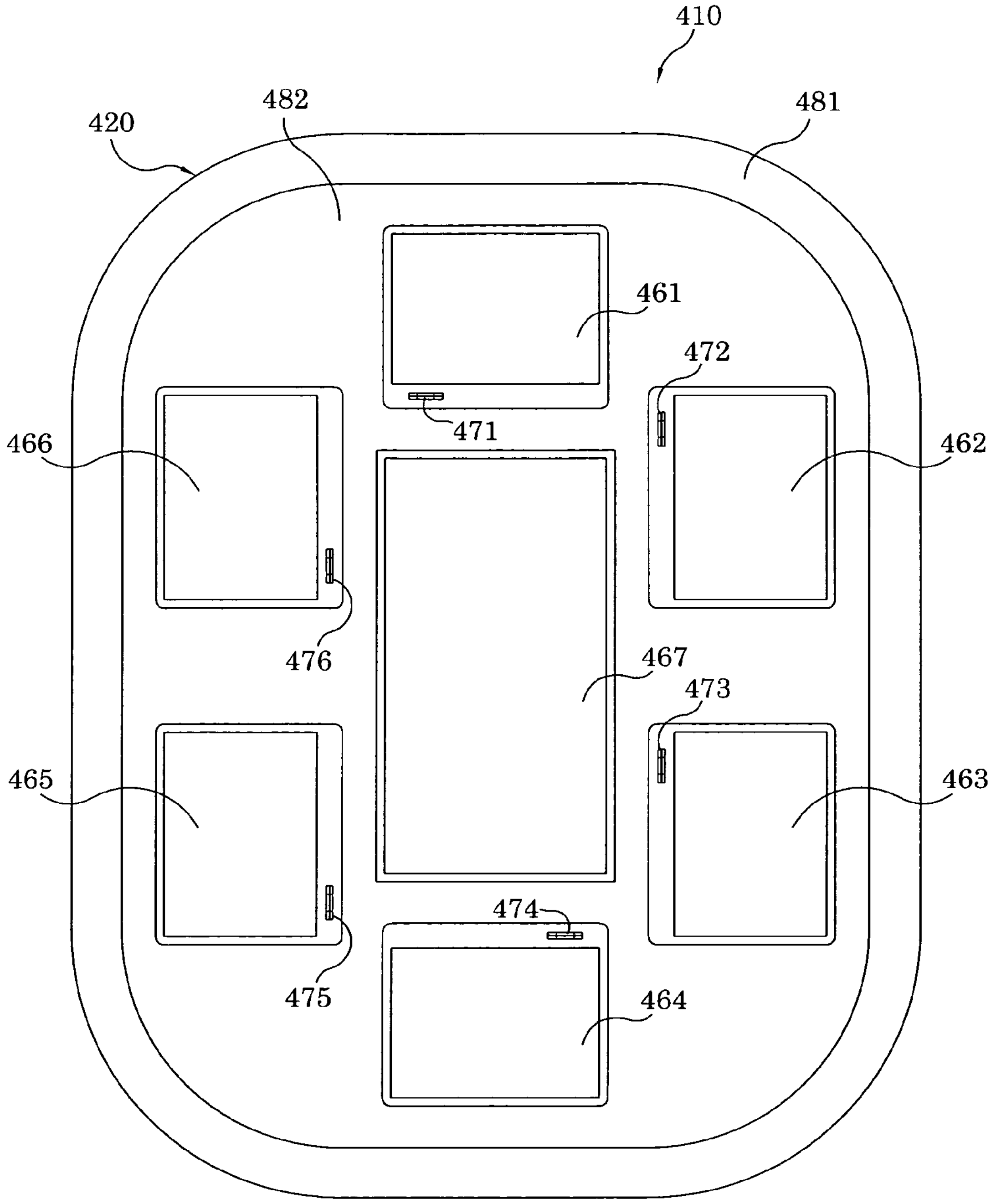
FIG. 9 is an alternative multiple participant table showing another embodiment according to the inventions which is adapted for play by a group of players without a designated dealer position.

FIG. 1 shows one preferred embodiment which is in the form of a multiple participant gaming system having positions for multiple live participants. FIG. 9 shows another alternative multiple participant gambling system 410 which is also for multiple participants but does not have a designated dealer position for attendance by a live dealer. Instead, the system is used to accommodate multiple player participants without a designated live dealer.

First Preferred Gambling Game System

System 10 includes a table structure 20. Table 20 includes a support base which is advantageously made in a form having a set of legs. As shown, the support base is in a trestle configuration having two end pieces having legs with feet that rest upon a supporting floor or other structure. A trestle beam 22 extends between the end pieces and serves to add greater structural rigidity.

The multiple participant system shown in FIG. 1 preferably has at least one dealer position and at least one player position. More preferably a plurality of player positions are shown, specifically six player positions and one dealer position. The dealer position is adjacent to a dealer display 50. The six player positions are adjacent to player displays 61-66. As shown, the dealer position also has a money receptacle in the form of money receiver 24 having a slot into which bills are fed when a player is using currency, casino paper credit slips or other such credit or value. The dealer display 50 is preferably in the form of a touch screen display through which the dealer also inputs any game inputs and options for which the dealer is responsible.

The casino gaming table 10 of FIG. 1 also shows player inputs in the form of either or both touch screen displays 61-66 and/or manually depressed controls 67. The choice is optional or both can be used to provide advantages particular to the game being played on a particular table.

FIG. 1 further shows player card readers 71-76. Card readers 71-76 can be used to read credit cards, debit cards, casino voucher or credit cards, identification cards, or other suitable money, credit or identification equivalents.

Second Preferred Gambling Game System

FIG. 9 shows another form in which inventions according to the inventions hereof may be embodied in another preferred form. Numbers that represent the same or similar to features for the version of FIG. 9 are numbered four in the hundreds column with respect to similar numbers for the embodiment of FIG. 1.

FIG. 9 shows a multiple participant table 410 used to play poker or other games which may be suitably played without the need for a live dealer. Alternatively, a dealer function might be, to whatever degree needed, be completely automated or performed by one or more of the players. Still further it may be alternated amongst the players or performed by the players in response to their request or requests for cards from the processor. Such will depend on the desired system and particular type or rules of the game being played.

Gambling game system 410 includes a processor (not shown in FIG. 9) either on-board or remote, such as described in connection with the gambling game system 110. A preferred placement is beneath the table top. The upper surface or field surface 482 provides the top of the table and can be felted or otherwise covered as desired. A padded surround 481 is also shown for comfort of the players.

The gambling gaming system 410 shown in FIG. 9 includes six player positions adjacent to six player display and control panels 461-466. The player display and control panels 461-466 may provide information about one or more of the following: the player's available money or credit; active player on the table; display of player cards or other symbols; control touch screen soft keys; amounts bet; cards held by others; common cards; or other desired information. FIG. 9 shows the bezel or surround about the player displays as being provided with identification card reader receptacles 471-476 serving the same functions as described above with regard to identification, money equivalent, credit or other identification or monetary value functions as explained with regard to the slots and associated readers 71-76 of the embodiment of FIG. 1.

FIG. 9 also shows a central display 467 which may show a variety of different types of information. In the preferred embodiment shown, it is used to essentially show the action of a poker game and presents information that is the equivalent to what might appear on a manual table with enhancements as desired. Displayed information may include: common cards shared by one or more players; the number of cards dealt to all players; the active player; the bets placed by each active player; the size of the pot or other prize or award available; recommended strategy; scores and other information may also be shown as is needed or particular to a game or the rules being played.

Electronic Diagrams of Preferred Embodiments

Figure 2:
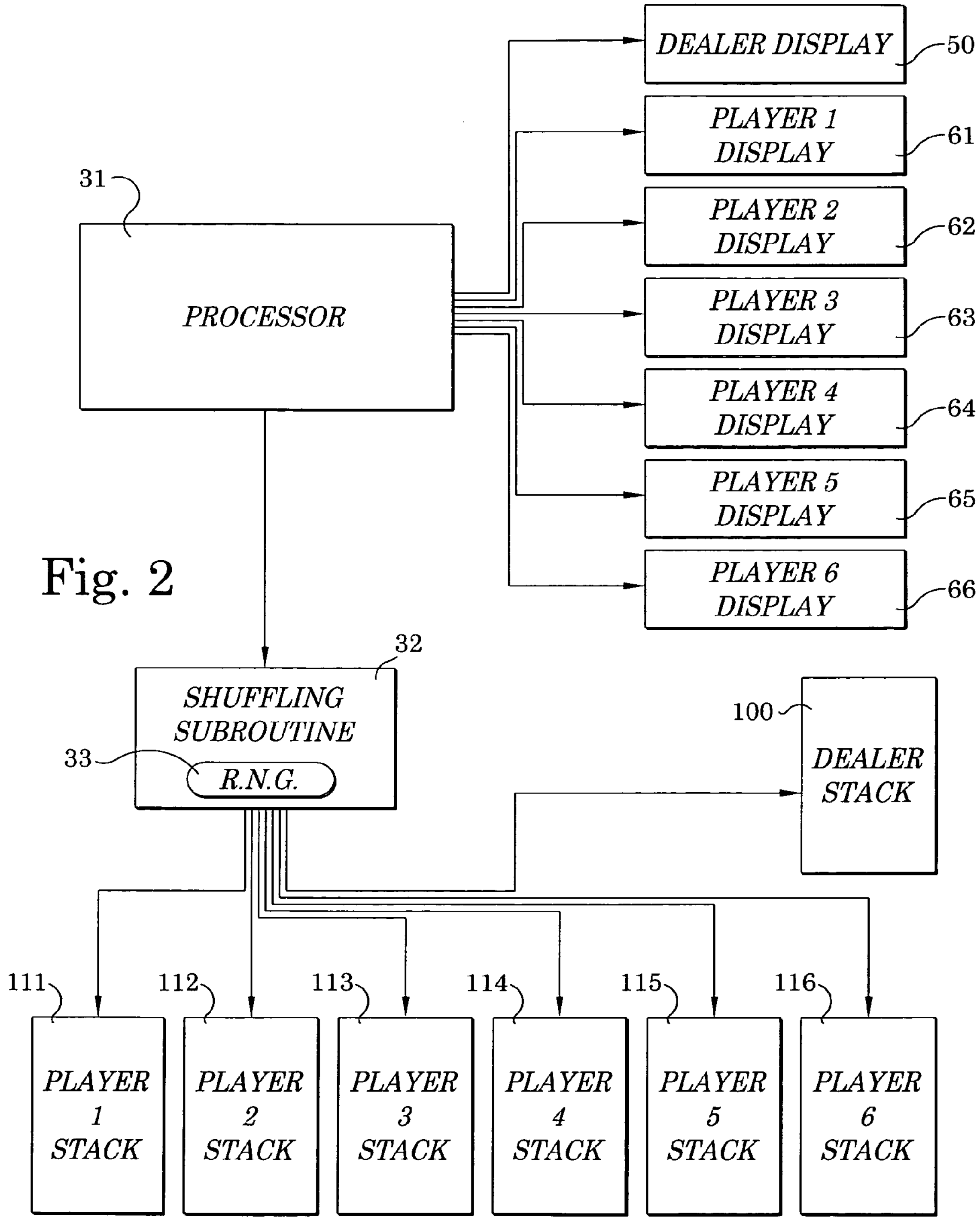
FIG. 2 is a diagram illustrating components used in systems according to some preferred embodiments according to the inventions.

FIG. 2 shows a diagram of a preferred electronic layout of a first preferred version of an electronic control system which may be used in the table of FIG. 1. The electronics preferably include a processor which is advantageously on-board the table, but can alternatively be placed elsewhere and the table can be connected or disconnected to a suitable processor or processors which are remote from the table.

FIG. 2 also shows the dealer display 50 and player displays 61-66. For purposes of FIG. 2 the player controls are assumed to be part of touch screen displays. The bill validator or other bill acceptor 24 is not shown but is connected to the processor 31 as is appropriate. Optional identification readers and player control buttons are further not shown in FIG. 2 or FIG. 3 for purposes of simplicity but should be understood to be connected as appropriate depending on the particular design of the table and control system.

Whether the processor is on the table 10 or elsewhere it includes a shuffling subroutine 32 having a random number generator. The operation of current versions of shuffling subroutine is described further below and future techniques may also be possible.

The shuffling or reordering process performed by subroutine 32 of FIG. 2 is used to define a single dealer stack or other symbol set 100. This dealer symbol set is thus different from and can be totally discrete from any other player stack. It may also alternatively include in part all or portions of a common stack or other symbol set (not shown). In many preferred versions the dealer and player stacks are totally discrete. In some games shared symbols may be desired.

FIG. 2 also shows the shuffling subroutine defining player stacks or other symbol sets 111-116. Thus, when players are assigned or dealt cards or other symbols from their respective stacks or other symbol sets, the symbols they receive are in whole or part independent from those assigned to other players and the dealer.

Electronic Diagrams of Second Preferred Embodiment

Figure 3:
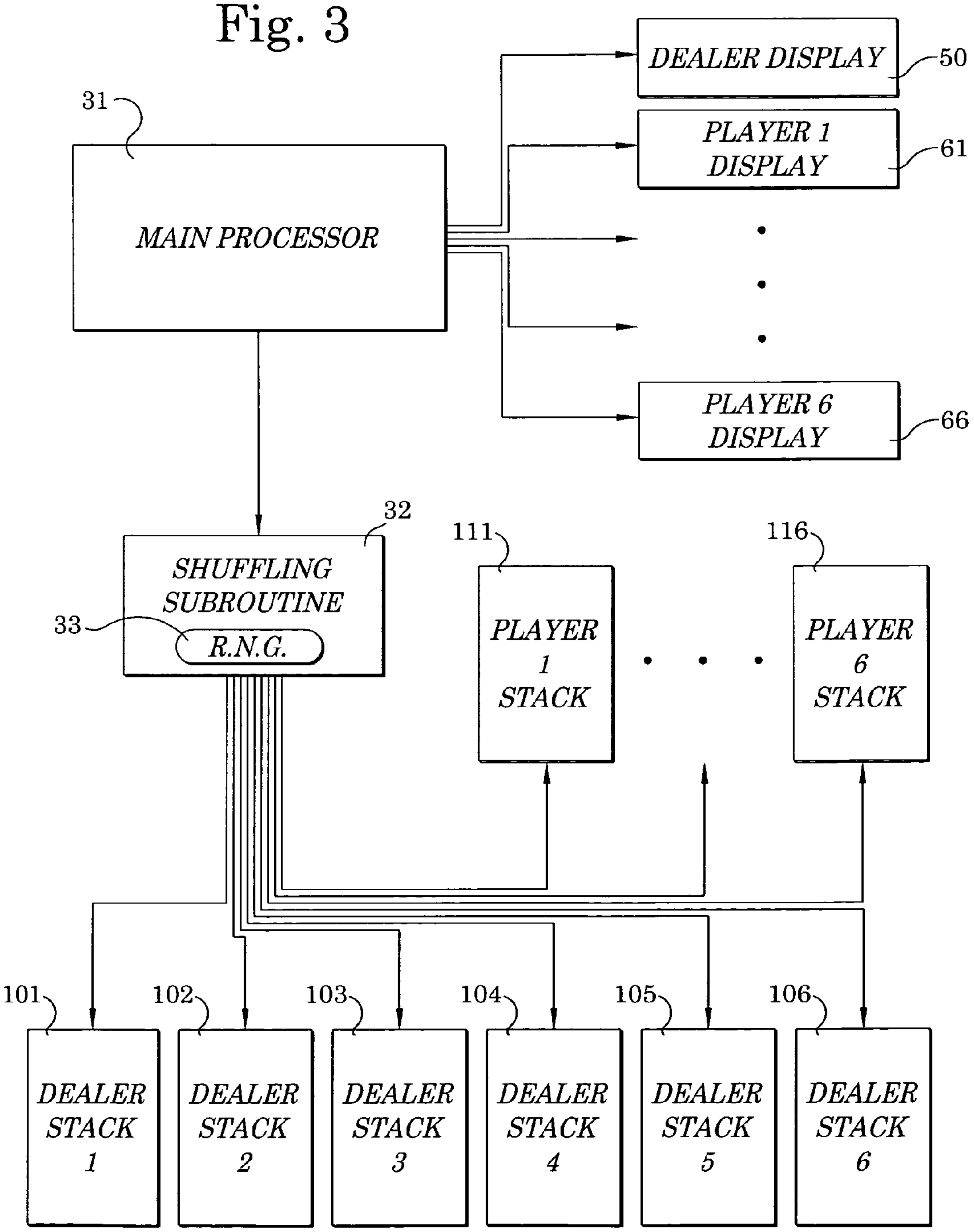
FIG. 3 is a diagram illustrating components used in systems according to other preferred embodiments of the inventions.

FIG. 3 shows another preferred alternative of the inventions where the construction includes a plurality of dealer stacks or other symbol sets 101-106. Theses stacks or symbol sets 101-106 are used by the dealer relative to assigning cards or other symbols to the dealer for play with the respective players at displays 61-66.

In alternative forms of the invention the dealer may have one or more stacks or symbol sets, even one or more symbol sets for each player or some of the players according to rules or desirable aspects of the invention.

In alternative forms the players may also have one or more stacks or symbol sets.

Shuffling or Reordering

The shuffling of card symbols or other symbols constitutes a reordering of the symbol sets. This can be done a single time during play of a game or multiple times during the course of playing the game. Another approach is to shuffle or reorder the symbols between assignment of each symbol to a player or dealer so that the next symbol assigned is unknown until just before the assignment or after a prior assignment in anticipation for another possible assignment next in turn for the particular participant involved.

A further alternative process for shuffling or reordering is to remove previously assigned cards or other symbols from the symbol sets so that such symbols are not likely to appear or if there are plural such symbols (such as multiple decks of cards within a symbol set), then the frequency or likelihood of such symbol appearing is changed.

Other approaches to changing the symbol set during reordering may also be used as appropriate for the particular game being played. For example, all of a particular card may be removed from a symbol set after it has been once assigned. Although such variations are not necessarily preferred in most current casino gambling games, such is possible and can be implemented in the conduct of variant versions of the inventions taught herein.

Sequencing of Shuffling or Reordering of Symbol Sets.

Figure 4:
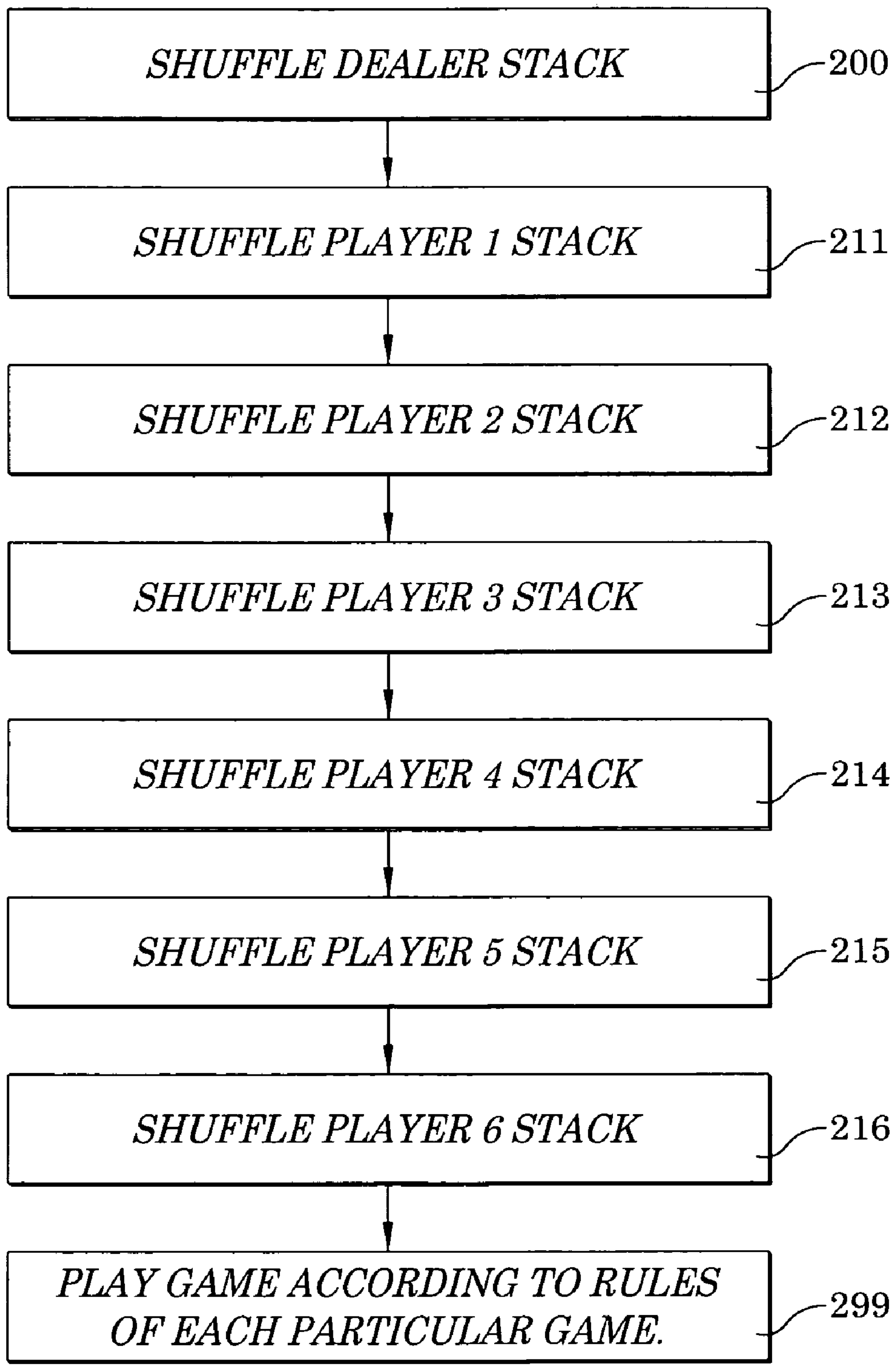
FIG. 4 is a flow diagram illustrating preferred processes according to one embodiment of the inventions.

FIG. 4 shows one preferred method for performing the operation and methods of the inventions described herein. In step 200 the processor shuffles the dealer stack in a first step 200. Thereafter a similar reordering of the symbol sets can be done for players one through six in steps 211-216. The play of the game is then performed in either a form which utilizes the defined stacks or symbol sets, or this process can be repeated depending on the rules of the game. Reordering can be performed according to various schemes as explained above wherein reordering occurs during the actual play of the game. Each stack or symbol set may be treated the same or according to another reordering scheme because they are different or totally distinct from each other.

Figure 5:
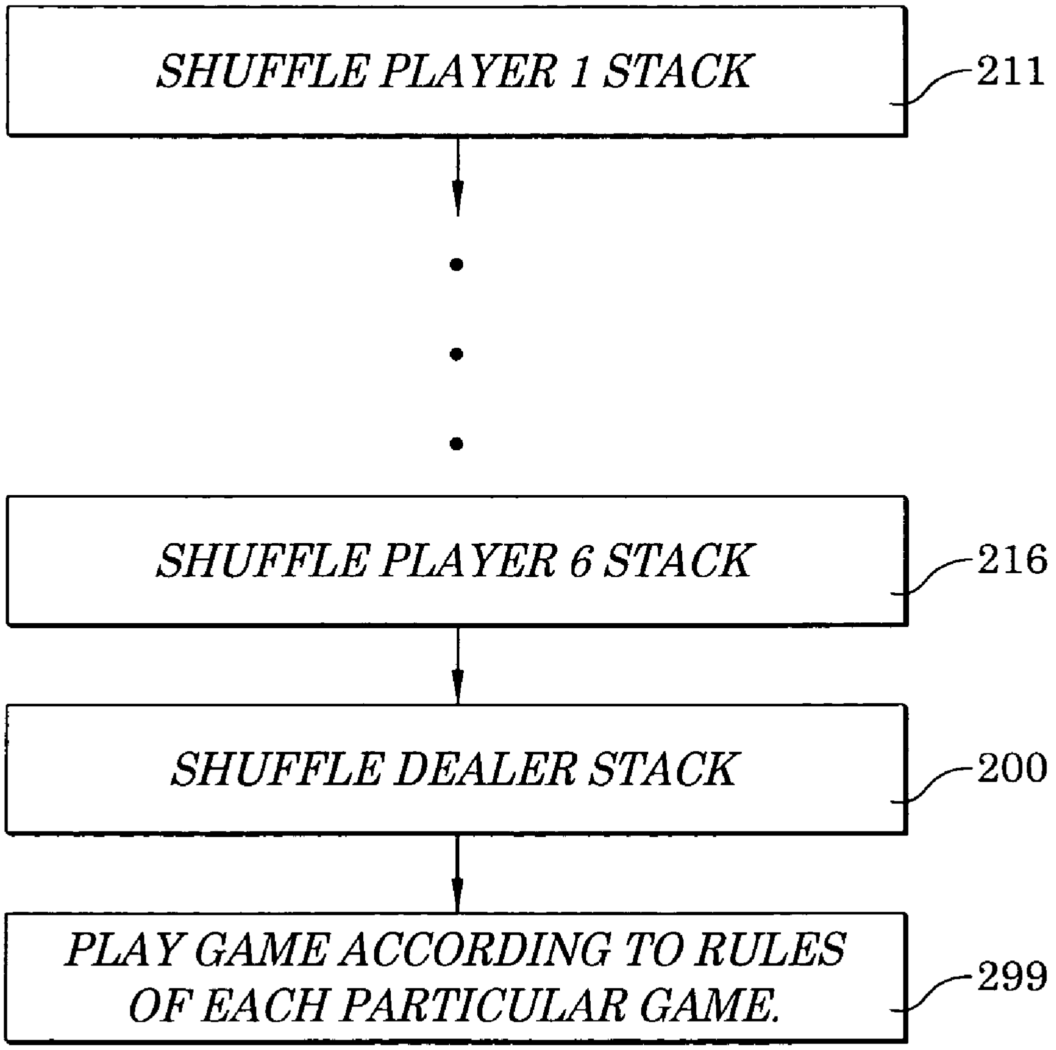
FIG. 5 is a flow diagram illustrating preferred processes according to another embodiment of the inventions.

FIG. 5 shows another sequence for assigning symbols wherein the player stacks or symbol sets are performed first in steps 211-216 and then the at least one dealer stack 200 is reordered. Similarly, the game is played according to the rules as diagrammatically shown in step 299.

FIG. 5 is also representative of a typical implementation of the symbol set reordering process that might be used in a game played on the gambling game system shown in FIG. 9. Other routines as shown and described elsewhere may also be used and a dealer stack or symbol set may be needed or not needed depending upon the game. The “dealer” symbol set may alternatively serve as a community card symbol set separate from each player symbol set or variants of symbol sets.

Figure 6:
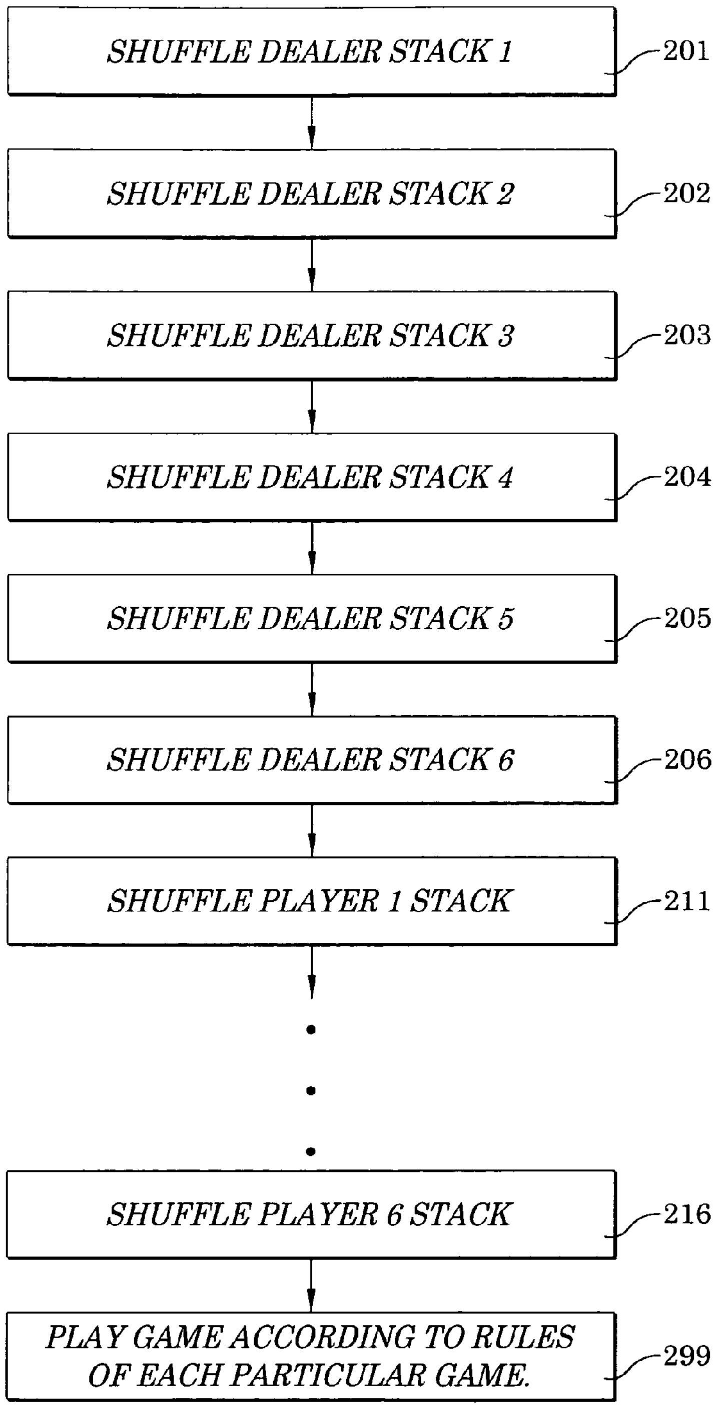
FIG. 6 is a flow diagram illustrating preferred processes according to one embodiment of the invention.

FIG. 6 shows a further version of incorporating the inventions described herein. In the process of FIG. 6 the dealer has at least one stack or symbol set per player. These are reordered or shuffled in steps 201-206. The at least one player stacks are reordered in steps 211-216 and the game is played as appropriate in step 299. Again the process of FIG. 6 can be performed once or multiple times during play of the game.

Figure 7:
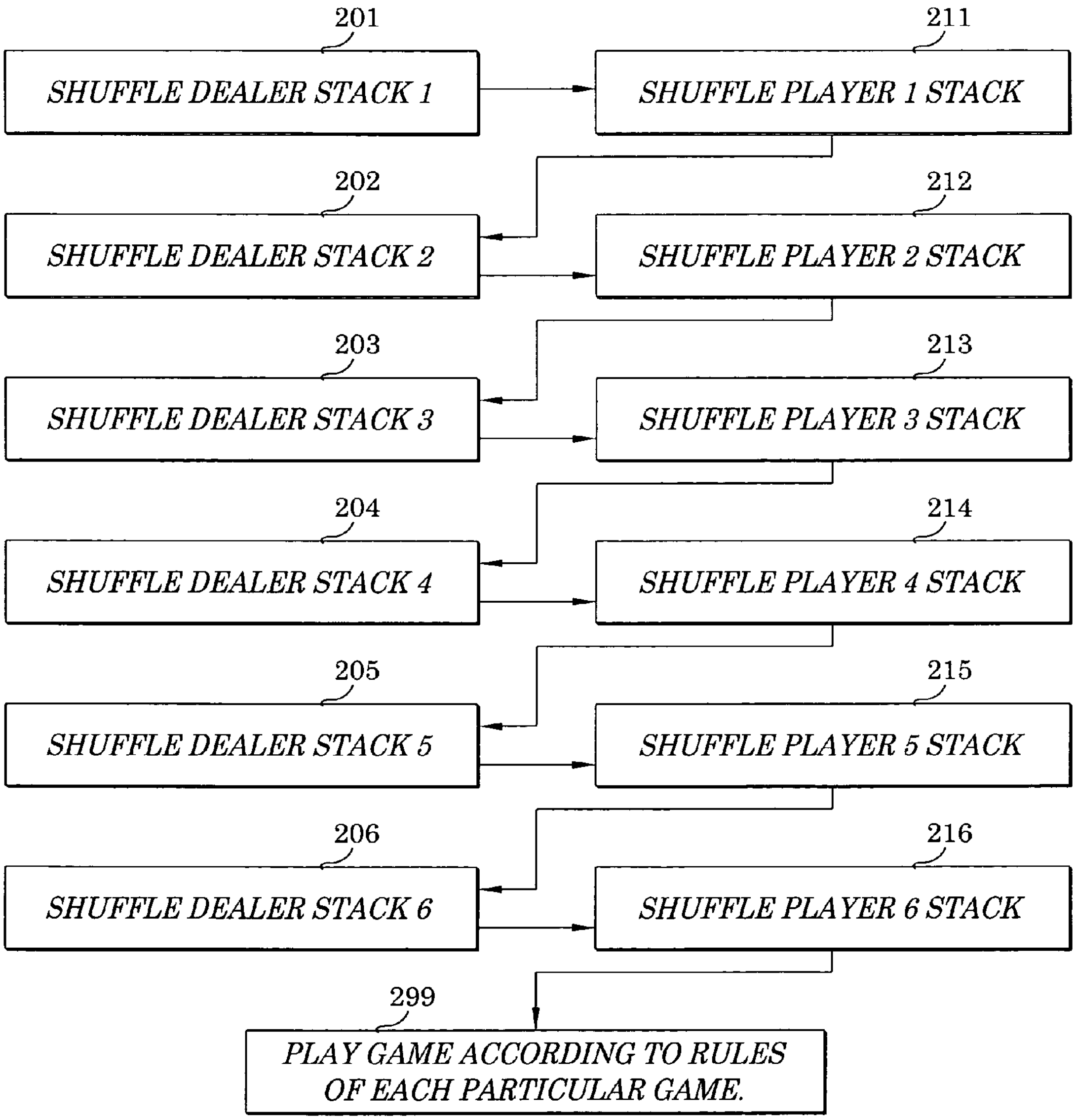
FIG. 7 is a flow diagram illustrating preferred processes according to one embodiment of the invention.

FIG. 7 shows another process which may be used with inventions according hereto. The plural dealer stacks which are preferably associated with each of the players or active players (player positions at which a person is playing). The dealer stack for player one is shuffled or reordered in step 201. Then the associated dealer stack is shuffled in step 211. The dealer stacks and player stacks or other symbol sets are thus shuffled or otherwise reordered alternately in steps 202, 212; 203, 213; 204, 214; 205, 215; and 206, 216 to perform the reordering for the respective stacks associated with dealer and player participation in an alternating sequential fashion. Step 299 shows the sequence of reordering steps is thus performed prior to play of a game or the play of a portion of a game, for example one round of dealing cards to each player and a dealer.

Figure 8:
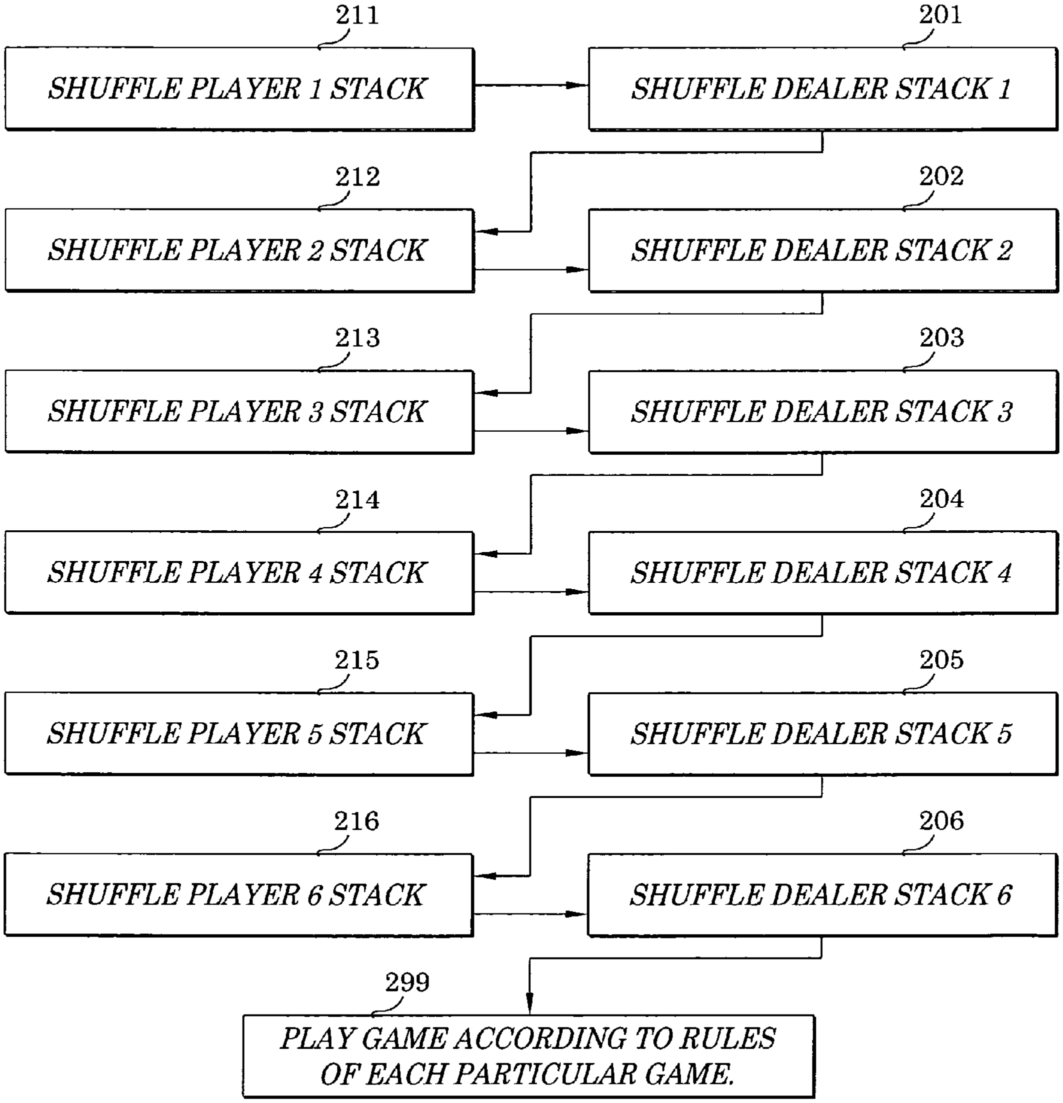
FIG. 8 is a flow diagram illustrating preferred processes according to one embodiment of the invention.

FIG. 8 shows another process similar to that shown in FIG. 7 with the player stacks or symbol sets being shuffled or otherwise reordered first and sequentially intermittently with the dealer stacks. Game play or play of a round or other portion of the game is represented by step 299.

Further Aspects and Features

The above description has set out various features and aspects of the invention and the preferred embodiments thereof. Such aspects and features may further be defined according to the following claims which may individually or in various combinations help to define the invention.

Interpretation Note

The inventions shown and described herein have been described in language directed to the current preferred embodiments. Also shown and described with regard to various structural and methodological features. The scope of protection as defined by the claims is not intended to be necessarily limited to the specific sizes, shapes, features or other aspects of the preferred embodiments shown and described. The claimed inventions may be implemented or embodied in other forms while still including the concepts shown and described herein. Also included are equivalents of the inventions which can be made without departing from the scope of concepts properly protected hereby.

We claim:

1. An apparatus forming a gambling gaming system for playing one or more games involving multiple participants, comprising:

at least one display for displaying virtual symbols assigned to said participants;

at least one processor for processing and assigning virtual symbols to said participants, and for providing information for displaying on said at least one display said virtual symbols so assigned as is appropriate according to the game or games being played;

wherein said at least one processor assigns multiple complete participant symbol sets of the virtual symbols, including at least one complete participant symbol set to each participant;

wherein for each individual round of a game being played, a participant is assigned virtual symbols only from the complete participant symbol set assigned to the participant and is assigned no virtual symbols from a symbol set first assigned to a dealer or another participant; and wherein the complete participant symbol sets are functionally isolated from each other and from one or more symbol sets assigned to the dealer in order to secure a game outcome of each participant from being affected by an action of another participant.

2. An apparatus according to claim 1 wherein the at least one display is further defined by having plural displays.

3. An apparatus according to claim 1 wherein the at least one processor assigns at least one participant symbol set using a random number generator.

4. An apparatus according to claim 1 wherein the at least one processor shuffles each of the participant symbol sets by reordering each participant symbol set between said each individual round of a game being played.

5. An apparatus according to claim 4 wherein the at least one processor shuffles each of the participant symbol sets by reordering each participant symbol set with previously assigned virtual symbols excluded.

6. An apparatus according to claim 1 wherein the at least one processor assigns the participant symbol sets to the participants in a sequential manner.

7. An apparatus according to claim 1 wherein the at least one processor assigns participant symbol sets to the participants in a manner wherein the dealer receives at least one functionally independent dealer symbol set and the participants each receive at least one functionally independent participant symbol set.

8. An apparatus according to claim 1 wherein the at least one processor assigns virtual symbols from the respective participant symbol sets to the participants in a manner wherein dealer virtual symbols are assigned intermittently with player participant virtual symbols.

9. An apparatus according to claim 1 wherein the at least one processor assigns virtual symbols from the respective participant symbol sets to the participants in a random manner.

10. An apparatus according to claim 1 wherein the at least one processor assigns virtual symbols from the respective participant symbol sets to the participants first and then assigns virtual symbols to the dealer from the dealer symbol set.

11. An apparatus according to claim 1 wherein the at least one processor first assigns virtual symbols from the dealer symbol set to the dealer and then assigns virtual symbols from the participant symbol sets to the respective participants.

12. An apparatus forming a gambling gaming system for playing one or more casino games involving multiple participants including a live dealer and at least one live player, comprising:

at least one display for displaying virtual symbols assigned to said participants;

at least one processor for processing and assigning virtual symbols to said participants, and for providing information for displaying on said at least one display said virtual symbols so assigned as is appropriate according to the game or games being played;

wherein said at least one processor assigns multiple complete participant symbol sets of the virtual symbols, including at least one complete participant symbol set to each participant;

wherein for each individual round of a game being played, a participant is assigned virtual symbols only from the complete participant symbol set assigned to the participant and is assigned no virtual symbols from a symbol set first assigned to a dealer or another participant; and wherein the complete participant symbol sets are functionally isolated from each other and from one or more symbol sets assigned to the dealer in order to secure a game outcome of each participant from being affected by an action of another participant.

13. An apparatus according to claim 12 wherein the at least one display is further defined by having plural displays.

14. An apparatus according to claim 12 wherein the at least one processor assigns at least one participant symbol set using a random number generator.

15. An apparatus according to claim 12 wherein the at least one processor shuffles each of the participant symbol sets by reordering each participant symbol set between said each individual round of a game being played.

16. An apparatus according to claim 15 wherein the at least one processor shuffles each of the participant symbol sets by reordering each participant symbol set with previously assigned virtual symbols excluded.

17. An apparatus according to claim 12 wherein the at least one processor assigns the participant symbol sets to the participants in a sequential manner.

18. An apparatus according to claim 12 wherein the at least one processor assigns participant symbol sets to the participants in a manner wherein the dealer receives at least one functionally independent dealer symbol set and the participants each receive at least one functionally independent participant symbol set.

19. An apparatus according to claim 12 wherein the at least one processor assigns virtual symbols from the respective participant symbol sets to the participants in a manner wherein dealer virtual symbols are assigned intermittently with participant virtual symbols.

20. An apparatus according to claim 12 wherein the at least one processor assigns virtual symbols from the respective participant symbol sets to the participants in a random manner.

21. An apparatus according to claim 12 wherein the at least one processor assigns virtual symbols from the respective participant symbol sets to the participants first and then assigns virtual symbols to the dealer from the dealer symbol set.

22. An apparatus according to claim 12 wherein the at least one processor first assigns virtual symbols from the dealer symbol set to the dealer and then assigns virtual symbols from the participant symbol sets to the respective participants.

23. An apparatus forming a gambling gaming system for playing one or more live casino games involving multiple participants including a live dealer and the capability of having a plurality of live players participate, comprising:

at least one display for displaying virtual symbols assigned to said participants;

at least one processor for processing and assigning virtual symbols to said participants, and for providing information for displaying on said at least one display said virtual symbols so assigned as is appropriate according to the game or games being played;

wherein said at least one processor assigns multiple complete participant symbol sets of the virtual symbols, including at least one complete participant symbol set to each participant;

wherein for each individual round of a game being played, a participant is assigned virtual symbols only from the complete participant symbol set assigned to the participant and is assigned no virtual symbols from a symbol set first assigned to a dealer or another participant; and wherein the complete participant symbol sets are functionally isolated from each other and from one or more symbol sets assigned to the dealer in order to secure a game outcome of each participant from being affected by an action of another participant.

24. An apparatus according to claim 23 wherein the at least one display is further defined by having plural displays.

25. An apparatus according to claim 23 wherein the at least one processor assigns at least one participant symbol set using a random number generator.

26. An apparatus according to claim 23 wherein the at least one processor shuffles each of the participant symbol sets by reordering each participant symbol set between said each individual round of a game being played.

27. An apparatus according to claim 26 wherein the at least one processor shuffles each of the participant symbol sets by reordering one each participant symbol set between assignment of symbols with previously assigned virtual symbols excluded.

28. An apparatus according to claim 23 wherein the at least one processor assigns the participant symbol sets to the participants in a sequential manner.

29. An apparatus according to claim 23 wherein the at least one processor assigns participant symbol sets to the participants in a manner wherein the dealer receives at least one functionally independent dealer symbol set and the participants each receive at least one functionally independent participant symbol set.

30. An apparatus according to claim 23 wherein the at least one processor assigns virtual symbols from the respective participant symbol sets to the participants in a manner wherein dealer virtual symbols are assigned intermittently with participant virtual symbols.

31. An apparatus according to claim 23 wherein the at least one processor assigns virtual symbols from the respective participant symbol sets to the participants in a random manner.

32. An apparatus according to claim 23 wherein the at least one processor assigns virtual symbols from the respective participant symbol sets to the participants first and then assigns virtual symbols to the dealer from the dealer symbol set.

33. An apparatus according to claim 23 wherein the at least one processor first assigns virtual symbols from the dealer symbol set to the dealer and then assigns virtual symbols from the participant symbol sets to the respective participants.

34. A method for playing a gambling game or games involving virtual symbols assigned to multiple participants, comprising:

providing a plurality of virtual symbol sets with at least one virtual symbol set assigned respectively to each active participant;

shuffling the plurality of virtual symbol sets, the shuffling for each of the plurality of virtual symbol sets being different for each at least one symbol set assigned to each active participant;

assigning one or more symbols to each active participant from the shuffled symbol sets assigned to each respective participant;

wherein for each individual round of a game being played, a participant is assigned virtual symbols only from the virtual symbol set assigned to the participant and is assigned no virtual symbols from a virtual symbol set first assigned to a dealer or another participant; and wherein the virtual symbol sets are functionally isolated from each other and from one or more virtual symbol sets assigned to the dealer in order to secure a game outcome of each participant from being affected by an action of another participant.

35. A method according to claim 34 and further comprising displaying at least a portion of the virtual symbol sets.

36. A method according to claim 34 and further comprising shuffling the virtual symbol sets between assigning one or more symbols to each active participant.

37. A method according to claim 34 and further comprising shuffling the virtual symbol sets between assigning one or more symbols to each active participant with previously assigned symbols removed from the symbol sets from which symbols are assigned.

* * * * *